United States Patent [19]

Barnsbee et al.

[11] 4,239,164
[45] Dec. 16, 1980

[54] LIGHT LOCK FOR ROLL DISPENSING CONTAINER

[75] Inventors: Clive D. Barnsbee, Webster; Marvin G. Decker, Rochester, both of N.Y.

[73] Assignee: Eastman Kodak Company, Rochester, N.Y.

[21] Appl. No.: 970,499

[22] Filed: Dec. 18, 1978

[51] Int. Cl.³ .......................................... B65H 19/02
[52] U.S. Cl. .............................. 242/55.53; 206/409; 225/52; 242/71.1; 242/71.7
[58] Field of Search ............... 242/71.1, 71.2, 197, 242/55.53, 71.7; 354/275, 277, 216; 206/389, 409; 225/52, 51, 106

[56] References Cited

U.S. PATENT DOCUMENTS

| 1,001,402 | 8/1911 | Hindle | 242/55.53 |
| 1,408,499 | 3/1922 | Casterline et al. | 225/52 X |
| 1,459,914 | 6/1923 | Knorr | 242/71.1 |
| 1,540,876 | 6/1925 | Dwyer | 242/55.53 |
| 1,609,862 | 12/1926 | Clifford | 242/55.53 |
| 1,816,384 | 7/1931 | Marcalus | 225/52 |
| 2,276,414 | 3/1942 | Morehouse et al. | 225/52 X |
| 2,806,529 | 9/1957 | Bulman | 225/52 |
| 3,384,318 | 5/1968 | Nerwin et al. | 242/71.1 |
| 3,612,424 | 10/1971 | Friedel | 242/71.1 |
| 3,687,386 | 8/1972 | Sandbach | 242/55.53 |
| 3,945,584 | 3/1976 | Mangan | 242/71.7 X |
| 4,034,929 | 7/1977 | Ebner | 242/71.1 |
| 4,068,247 | 1/1978 | Bouwen et al. | 354/275 |

FOREIGN PATENT DOCUMENTS

| 726708 | 3/1932 | France . |
| 950324 | 3/1949 | France . |
| 1179988 | 2/1970 | United Kingdom . |

*Primary Examiner*—Stanley N. Gilreath
*Attorney, Agent, or Firm*—M. S. Sales

[57] ABSTRACT

A container is disclosed for dispensing strip material having a light-sensitive layer on one side. A slot through which the strip material can be pulled from a roll of such material within the container has a first lip and a second lip spring resiliently urged toward the first lip. The lips are shaped so that tension in the strip material therebetween produces a resultant force which opposes the resilient force to reduce or eliminate pressure between the light-sensitive layer and the first lip.

1 Claim, 3 Drawing Figures

U.S. Patent      Dec. 16, 1980      4,239,164
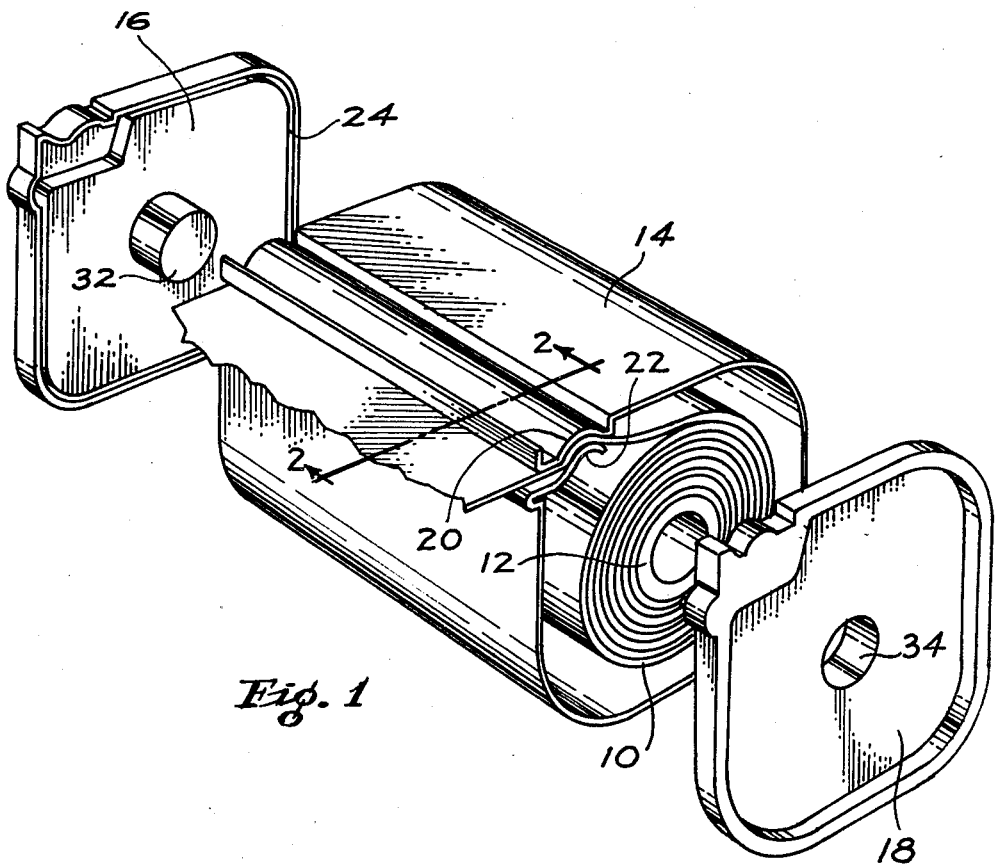
*Fig. 1*
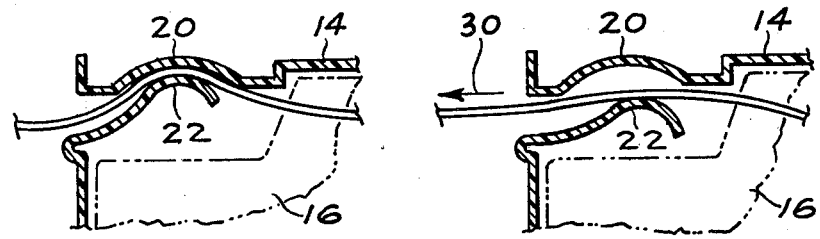
*Fig. 2*      *Fig. 3*

007 # LIGHT LOCK FOR ROLL DISPENSING CONTAINER

BACKGROUND OF THE INVENTION

1. Field of the Invention

The present invention relates to dispensing containers for light-sensitive strip material.

2. Description of the Prior Art

Containers for dispensing unexposed photographic film or paper from a roll into exposure apparatus under roomlight conditions are well known in the art and generally are fabricated of heavy paper, cardboard, or plastic materials. Some such containers are adapted to be loaded by the user, while others are preloaded by the manufacturer and are marketed with one of a variety of photosensitive roll products therein.

Commonly the containers have an elongated slot through which the strip material is pulled from the roll. Once the containers have been mounted in the exposure apparatus, the container slot is protected from ambient light to prevent exposure of the light-sensitive material within the container. However, it is necessary that the slot of so-called "roomlight load" containers be provided with means to inhibit entry of light when the container is not received in the exposure apparatus.

Conventional apparatus for inhibiting entry of light through the slot includes a fabric-like material, commonly referred to as "plush," on one or both sides of the slot. The plush has a pile depth sufficient to close the slot to light, while permitting the strip material to be pulled therethrough. Such apparatus provides adequate means for dispensing strip material, while protecting it from light prior to being dispensed. However, dirt or other foreign particles picked up by the plush and held in contact with the light-sensitive layer side of the strip material may scratch the surface of the light-sensitive layer as the strip material is pulled through the slot.

In order to eliminate the need for plush in the container's slot, some prior art containers, such as that shown in U.S. Pat. No. 3,612,424 which issued Oct. 12, 1971, to M. Friedel, have an exit slot which is curved in the direction of strip movement to form a serpentine (also referred to as S-shaped) path. However, as the strip is pulled through such slots, its emulsion side necessarily contacts a portion of the slot's wall and rubs against it. In many instances, such rubbing could abrade the light-sensitive layer of the strip.

SUMMARY OF THE INVENTION

In accordance with the present invention, an improved dispensing container is provided for rolled strip material having a light-sensitive layer on one side. The strip material can be pulled from the roll through a light tight slot formed without a plush lining. Light protection is provided by clamping that portion of the strip material which is in the slot between a first lip and a second, resiliently biased lip. The light-sensitive layer side of the strip faces the first lip but is prevented from rubbing against the first lip as the strip material is pulled through the slot because the lips are shaped so that tension in the strip as it is pulled from the roll produces a resultant force which opposes the force of the resiliently biased lip. Thus, the pressure between the light-sensitive layer and the first lip is reduced or eliminated.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is an exploded perspective view of a dispenser container in accordance with the present invention and further showing a received roll of strip material;

FIG. 2 is an enlarged sectional view of a portion of the container taken along lines 2—2 of FIG. 1; and FIG. 3 is a view similar to FIG. 2 with the strip material under tension.

DESCRIPTION OF THE PREFERRED EMBODIMENT

Referring to FIG. 1, a roll 10 of strip material, such as light-sensitive photographic paper or film, is shown in a container formed in accordance with a preferred embodiment of the present invention. The strip material includes a support layer and a light-sensitive layer. The material is wound about a supporting inner core 12 such that the light-sensitive layer of each convolution is on the outside of the convolution.

The dispenser container includes a central casing member 14 and two end caps 16 and 18. Casing member 14 may be formed from a generally flat plastic sheet having curved outer and inner lips 20 and 22, respectively, formed at opposed ends of the sheet. When folded into the rectangularly shaped tubular structure shown in FIG. 1, the curves of lips 20 and 22 generally mate so as to form an elongated slot through which strip material may be pulled from roll 10 and supplied to exposure apparatus (not shown). As can best be seen in FIG. 2, inner lip 22 forms an inherently flexible member which is "tucked into" outer lip 20 and is resiliently urged toward a surface of the outer lip by the natural resiliency of the material of casing member 14.

After cartridge casing member 14 has been shaped, end caps 16 and 18 are applied to the casing member with the ends of the cartridge casing member received in annular recesses 24 about the edges of the end caps. The recesses are enlarged in the region of the lips to receive the lips and to permit inward movement of inner lip 22 within the recesses. The end caps are bonded to casing member 14 such as by adhesive or ultrasonic bonding.

A leader portion of the strip material of roll 10 extends through the slot and is clamped between lips 20 and 22 to prevent light from entering the container through the slot. The light-sensitive layer of the strip material is pressed against the inner surface of outer lip 20 by the spring action of inner lip 22 (FIG. 2).

Molded studs 32 and 34 on end caps 16 and 18 fit into the ends of core 12 and offer sufficient resistance to the turning of core 12 to tension the sheet material as it is pulled from roll 10. In FIG. 3, we have shown in somewhat exaggerated form the effect of tension in the strip material resulting from its being pulled in the direction of arrow 30. As the sheet material is tensioned, the resultant force opposes the force urging lip 22 toward lip 20, thus relieving the pressure between the light-sensitive layer's surface and lip 20. Depending upon the tension in the strip material, the curvature of lip 22 and the resilient force urging lip 22 toward lip 20, lip 22 may flex enough to eliminate contact between the strip material and lip 20, or the pressure between the strip material and lip 20 may merely be relaxed sufficiently to reduce the risk of scratching the light-sensitive layer.

From the above description, it is apparent that a dispensing container in accordance with the present invention provides important advantages not available from, or taught by, the prior art. Such a container provides protection from light and moisture for a roll of strip material therein, and is readily loaded into exposure apparatus in roomlight conditions. Such protection is achieved without the use of a plush liner in the exit slot and without pulling the light-sensitive side of the strip material across a stationary surface with enough force therebetween to abrade the layer's surface.

The invention has been described in detail with particular reference to preferred embodiments thereof, but it will be understood that variations and modifications can be effected within the spirit and scope of the invention.

We claim:

1. In a container having a generally tubular casing member and a pair of laterally opposed end walls enclosing a chamber for a roll of strip material with a light-sensitive, abradable layer, the improvement comprising:

a first elongated lip on the casing member extending in a direction substantially axially of the casing member;

a second elongated lip on the casing member substantially parallel to said first lip, said second lip being movable toward and away from said first lip to form therebetween a variable width slot which (1) communicates with the chamber, (2) provides a path through which strip material may be tensioned and pulled from the chamber with its light-sensitive layer toward said first lip and (3) is curved partially about an axis that is transverse to the direction of movement of strip material being pulled through the slot and is located on the same side of said slot as said second lip;

an annular recess on each of said end walls for receiving one end of the casing member and said lips, said annular recesses being enlarged in the region of said second lip for permitting movement of said second lip away from said first lip;

means for rotatably supporting a roll of strip material in the chamber with resistance of the roll turning; and resilient means for urging said second lip toward said first lip to clamp in said curved slot a portion of the strip material between said first and second lips with a predetermined pressure, whereby tension produced in said strip material is pulling it from the chamber produces a resultant force which opposes the force of said resilient means to at least partially relieve the pressure of the light sensitive layer of the strip material against said first lip.

* * * * *

UNITED STATES PATENT AND TRADEMARK OFFICE
CERTIFICATE OF CORRECTION

PATENT NO. : 4,239,164

DATED : December 16, 1980

INVENTOR(S) : Clive D. Barnsbee and Marvin G. Decker

It is certified that error appears in the above-identified patent and that said Letters Patent are hereby corrected as shown below:

Column 4, line 19, "of" should read --to--.

Column 4, line 25, "is" should read --in--.

Signed and Sealed this

Twenty-eighth Day of April 1981

[SEAL]

Attest:

RENE D. TEGTMEYER

Attesting Officer     Acting Commissioner of Patents and Trademarks